(12) United States Patent
Wingett et al.

(10) Patent No.: US 8,033,525 B2
(45) Date of Patent: Oct. 11, 2011

(54) VALVE TRIM ADJUSTOR FOR A POPPET CONTROL VALVE

(75) Inventors: Paul Wingett, Mesa, AZ (US); Steve Abel, Chandler, AZ (US); Eric J. Ekstrom, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 657 days.

(21) Appl. No.: 12/188,811

(22) Filed: Aug. 8, 2008

(65) Prior Publication Data

US 2009/0283708 A1    Nov. 19, 2009

Related U.S. Application Data

(60) Provisional application No. 61/052,782, filed on May 13, 2008.

(51) Int. Cl.
*F16K 51/00* (2006.01)

(52) U.S. Cl. ....... 251/285; 251/60; 251/284; 251/335.3; 251/129.12

(58) Field of Classification Search .................. 251/285, 251/284, 60, 335.3, 129.12
See application file for complete search history.

(56) References Cited

U.S. PATENT DOCUMENTS

| | | | |
|---|---|---|---|
| 869,323 A | 10/1907 | Nolan | |
| 1,305,997 A * | 6/1919 | Fortney | 137/512.1 |
| 1,595,619 A | 8/1926 | Reck et al. | |
| 2,936,772 A | 5/1960 | Kinderman | |
| 3,008,492 A | 11/1961 | Lannert | |
| 3,175,473 A | 3/1965 | Boteler et al. | |
| 3,253,612 A * | 5/1966 | Curatola et al. | 137/553 |
| 3,409,271 A * | 11/1968 | Kallenbach | 251/265 |
| 4,014,514 A | 3/1977 | Priese et al. | |
| 4,083,379 A | 4/1978 | Aus der Au et al. | |
| 4,588,163 A | 5/1986 | Christensen | |
| 4,852,773 A * | 8/1989 | Standlick et al. | 222/504 |
| 4,928,920 A * | 5/1990 | Feild | 251/118 |
| 5,586,744 A | 12/1996 | Smith et al. | |
| 6,460,825 B1 * | 10/2002 | Nortier et al. | 251/42 |
| 6,905,108 B2 * | 6/2005 | Hall et al. | 251/285 |
| 6,994,312 B2 | 2/2006 | Pauer et al. | |
| 7,255,321 B2 | 8/2007 | Tomioka et al. | |
| 7,337,805 B2 * | 3/2008 | Brown et al. | 137/625.33 |
| 2003/0111622 A1 | 6/2003 | Jahn et al. | |
| 2006/0197049 A1 | 9/2006 | Hamada et al. | |
| 2008/0197307 A1 * | 8/2008 | Gethmann | 251/60 |

* cited by examiner

*Primary Examiner* — John Fristoe, Jr.
*Assistant Examiner* — Minh Le
(74) *Attorney, Agent, or Firm* — Ingrassia Fisher & Lorenz, P.C.

(57) ABSTRACT

A control valve having an external valve trim adjustor is provided. The control valve comprises a valve shaft comprising a contact member extending in a direction transverse to the valve shaft, a stationary valve cap adapted to receive the valve shaft, an adjustment member coupled to the valve cap, and a stop plate coupled to the contact member and threadedly coupled to the adjustment member, the stop plate positioned at least partially between the adjustment member and the contact member and adapted to position the contact member away from the valve cap in response to manipulation of the adjustment member.

19 Claims, 2 Drawing Sheets

VALVE TRIM ADJUSTOR FOR A POPPET CONTROL VALVE

CROSS-REFERENCE TO RELATED APPLICATION(S)

This application claims the benefit of U.S. provisional patent application Ser. No. 61/052,782, filed May 13, 2008.

TECHNICAL FIELD

Embodiments of the subject matter described herein relate generally to control valves. More particularly, embodiments of the subject matter relate to an adjustable trim for a control valve.

BACKGROUND

Control valves regulate the flow of fluid through some systems, permitting zero, partial, or full flow of fluid through the valve in response to control commands. In addition to adjusting the flow of fluid through the control valve between different operational states of the control valve, it is advantageous to calibrate flow through the valve during the operational states. Adjusting the valve in this manner is commonly known as adjusting the trim of the control valve.

Calibration of the valve can change the flow setting at various states of operation, such as how much fluid flows while in the maximally-open state, or whether some fluid is still permitted to flow in a maximally-closed state. Other intermediary states can have regulated flow amounts set by the calibration. It is advantageous to know precisely how much fluid will flow through the valve during the various states of operation or positions of the control valve. Thus, calibrating, or adjusting the trim of the control valve, differs from simply adjusting the fluid flow through the valve. Typically, such trim is a small adjustment relative to the changes between operational states of the control valve.

Some control valves can regulate the flow of toxic and/or hazardous fluids. In some control valves, calibration or other fine adjustment of fluid flow through the valve requires opening the valve or valve assembly and directly manipulating some of the components. Other valves can permit manipulation through external means but without sufficient sealing to contain the fluid within. In either case, it is not preferable to expose an operator adjusting or calibrating the valve to the fluid within the valve assembly. Accordingly, it is advantageous to adjust the trim of the control valve without permitting leakage or exposure of the fluid flowing through the control valve.

BRIEF SUMMARY

A control valve having an external valve trim adjustor is provided. The control valve comprises a valve shaft comprising a contact member extending in a direction transverse to the valve shaft, a stationary valve cap adapted to receive the valve shaft, an adjustment member coupled to the valve cap, and a stop plate coupled to the contact member and threadedly coupled to the adjustment member, the stop plate positioned at least partially between the adjustment member and the contact member and adapted to position the contact member away from the valve cap in response to manipulation of the adjustment member.

A valve adjustment assembly for a valve is also provided. The valve adjustment assembly comprises a valve shaft having a longitudinal axis and comprising a stop pin, the stop pin extending in a transverse direction to the longitudinal axis, an adjustment member surrounding the valve shaft, the adjustment member having a threaded surface and adapted to contact the stop pin, and a stop plate adapted to surround the adjustment member, contact the stop pin, and threadedly engage the threaded surface of the adjustment member, the stop plate adapted to change its position in response to rotation of the adjustment member, thereby changing the position of the stop pin.

A valve adjustment assembly for a poppet control valve comprising a valve shaft having a longitudinal axis is also provided. The valve adjustment assembly comprises a plate having a central threaded portion and a plurality of ports, an adjustable threaded member disposed in the central threaded portion and threadedly engaged with the plate, the adjustable threaded member positionable by rotation, a plurality of locking members disposed in the plurality of ports, the plurality of locking members adapted to inhibit movement of the plate, and a contact member coupled to the valve shaft, disposed in a transverse direction to the longitudinal axis, and contacting the adjustable threaded member.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
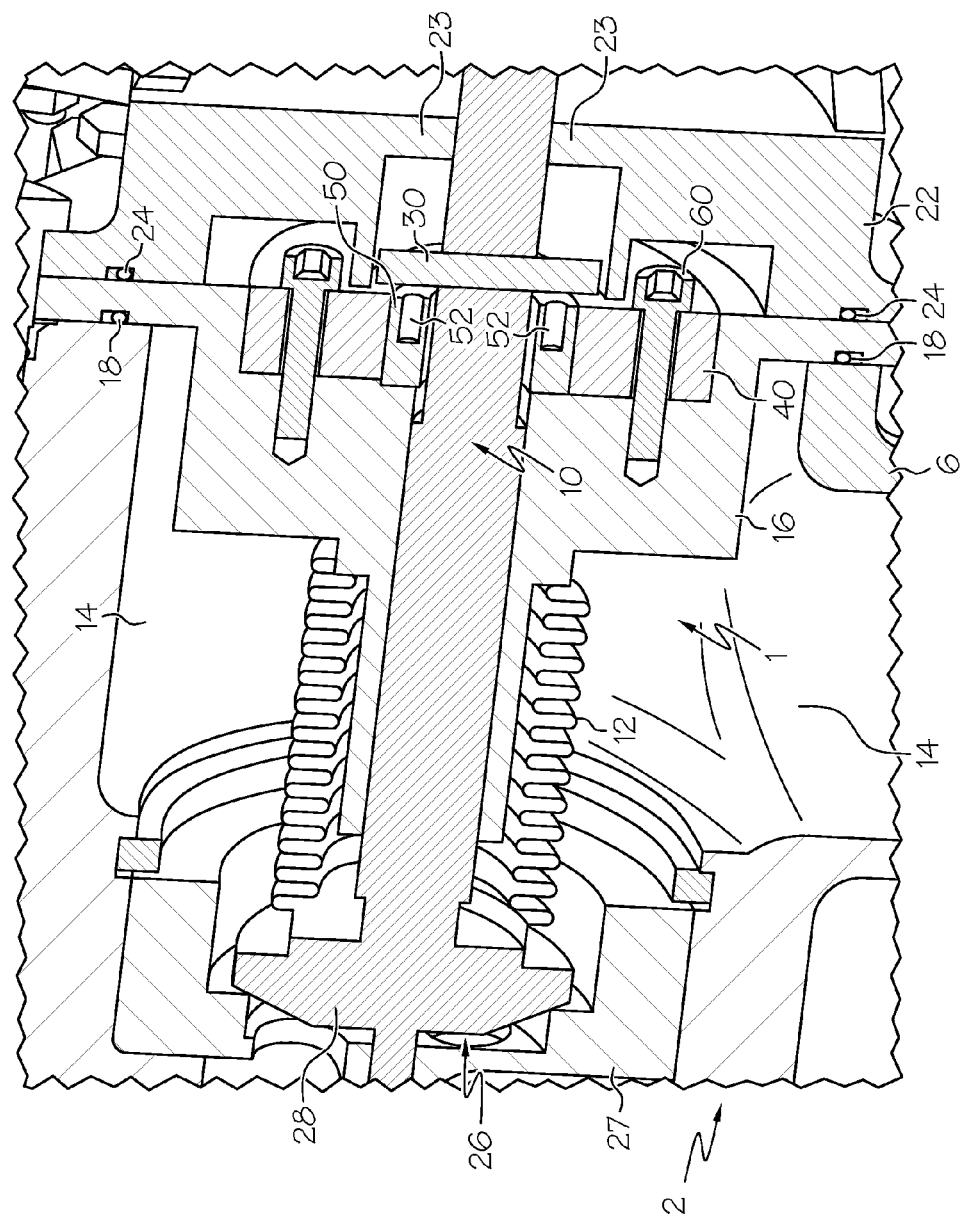
FIG. 1 is a perspective view of an embodiment of a valve adjustment assembly.
Figure 2:
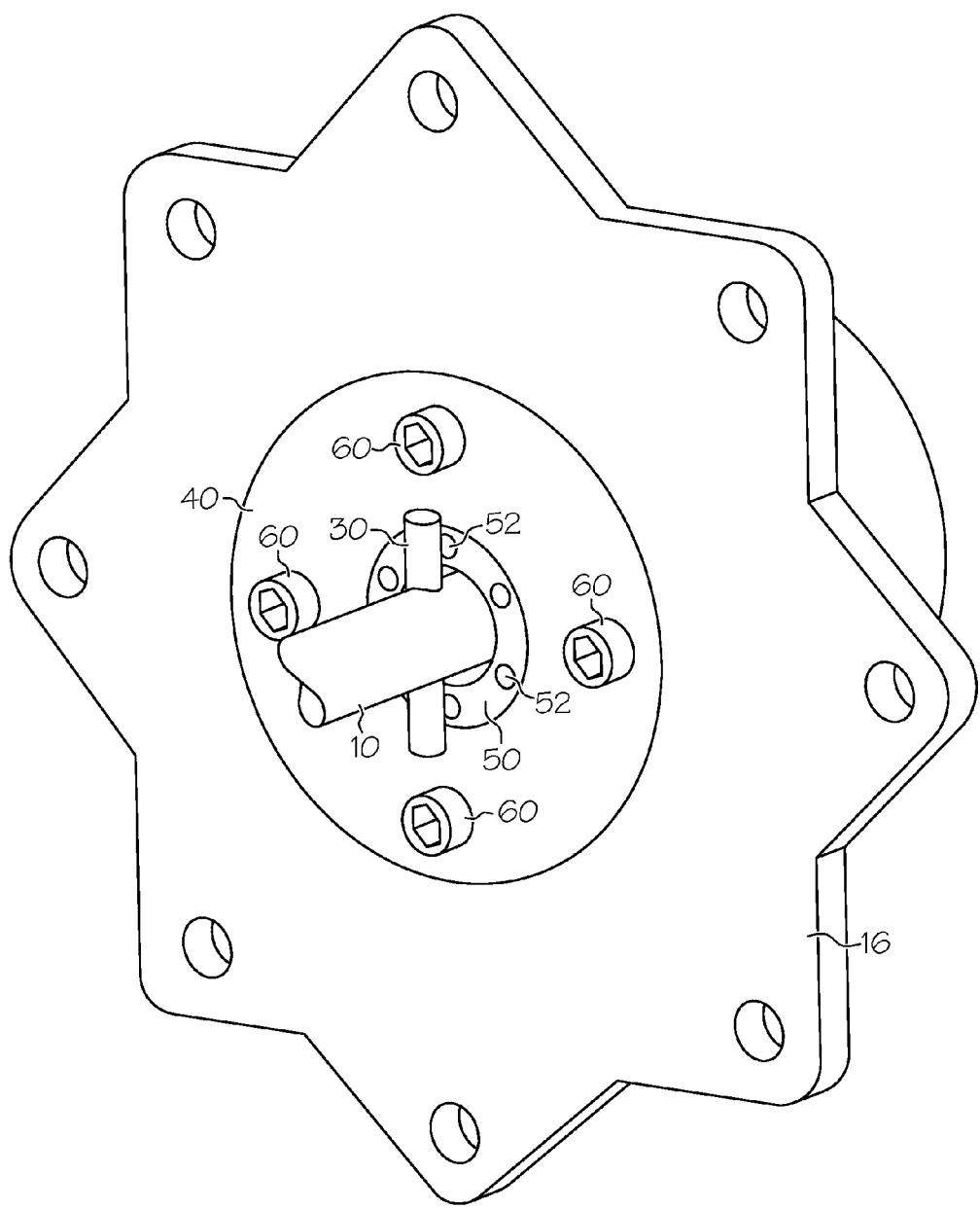
FIG. 2 is a cutaway perspective view of the embodiment of FIG. 1.

FIG. 1 illustrates an embodiment of a trim adjustor 1 for a control valve 2. FIG. 2 illustrates another view of the embodiment of FIG. 1, with some features transparent for ease of viewing, and some features omitted for clarity. The control valve 2 is preferably a poppet valve, but other embodiments of plunger-adjusted valves can also be used. The control valve 2 can be disposed in a conduit 6 and be sealed at one end by a valve cap or capping portion 16. The capping portion 16 can have a flange 18 extending around the circumference of the conduit 6 to seal its end, thereby preventing leakage a fluid from within the conduit 6. Preferably, the capping portion 16 is stationary relative to the conduit 6 and forms a fluid-tight seal with the conduit 6. A first O-ring 20 can be disposed in a groove of the flange 18. The first O-ring 20 can seal the control valve 2 and inhibit fluid from leaking around the capping portion 16. In some embodiments, a housing 22 can be coupled to the capping portion 16, redundantly sealing the control valve 2. The housing 22 can similarly have a groove or channel along its contact surface with the flange 18, a second O-ring 24 preferably seated therein.

The conduit 6 is preferably formed of a substance suited to contain the fluid within, preferably a metal, such as steel, including stainless steels, or other non-corroding metals. Similarly, the capping portion 16 can be stainless steel, another steel, aluminum, titanium, brass, any alloy thereof, or any other material suitable to the embodiment.

A valve shaft 10 can actuate the control valve 2, adjusting it between operable states and controlling the flow of fluid through the conduit 6. The valve shaft 10 preferably extends through the housing 22 and capping portion 16. In some embodiments, a flexible bellows 12 can surround the valve shaft 10, inhibiting fluid from leaking from the interior 14 of the conduit 6 to a space adjacent the valve shaft 10.

During typical operation, fluid flows along the conduit 6, and through one or more ports 26 in a seat 27. The sealing portion 28 can permit, control, or inhibit flow further past the seat 27 by changing its position. The position of the sealing portion 28 can be adjusted by adjusting the position of the valve shaft 10, coupled to the sealing portion 28. Thus, a change in position of the valve shaft 10 can result in a change in operational state of the valve 2, manifested as a change in the amount of fluid permitted to flow through the valve 2. Disposed perpendicularly through the valve shaft 10 can be a stop pin 30. The stop pin 30, though illustrated as a cylindrical shaft, can be any element extending through the valve shaft 10 of sufficient rigidity to maintain its shape and transmit force to the valve shaft 10. Preferably, the stop pin 30, or other contact element or member, extends in a traverse direction to the axis of the valve shaft 10. Thus, in the illustrated embodiment, the valve shaft 10 has its travel limited in the direction away from the valve 2 by contact between the stop pin 30 and the housing 22. As can be seen in FIG. 1, movement of the stop pin 30, together with the valve shaft 10, is limited when the stop pin 30 contacts a retention portion 23 of the housing 22. Such contact can be a limiting feature, preventing movement of the stop pin 30 beyond the housing 22.

In the direction of the valve 2, the stop pin 30 preferably limits travel by contacting the stop plate 40, which will be described in greater detail below. In certain embodiments, such as those where the adjustment member 50 protrudes above the stop plate 40, the stop pin 30 can contact the adjustment member 50 instead of the stop plate 40, thereby limiting travel of the stop pin 30 above the stop plate 40. Some other embodiments of the stop pin 30, shown here as a threaded member having a circular cross-section, can include pins or beam elements having different features, such as, threaded or smooth surfaces, as well as tri-directional or other multi-directional elements of varying cross-section, and so on. In some embodiments where the stop pin 30 is a separate component, it can be coupled to the alignment element 50. The portion of the valve shaft 10 comprising the stop pin 30 can be rigid or rotatable, with, in some embodiments, bearings present to facilitate rotation.

As described, fluid is permitted to enter the control valve 2 through one or more ports 26 in the seat 27, and flow past a sealing portion 28 of the valve 2. One limit of travel of the valve shaft 10 is the location of the stop plate 40. The valve shaft 10 is limited in its maximum movement toward the seat 27 by the contact between the stop pin 30 and the stop plate 40. When the stop plate 40 is in a first position near to the seat 27, the valve shaft 10, and correspondingly the sealing portion 28, can move closer to the ports 26, more effectively sealing the fluid passage with the sealing portion 28. When the stop plate 40 is in a second position farther from the ports 26, the valve shaft 10 will be inhibited from moving the sealing portion 28 as close to the seat 27 as in the first position. Accordingly, more fluid will be permitted to flow through the seat 27 past the sealing portion 28. Therefore, the position of the stop plate 40 relative to the seat 27 affects the amount of fluid passing through the control valve 2. Thus, by adjusting the position of the stop plate 40, an operator can adjust the flow of fluid through the valve 2, allowing for trim adjustment.

The stop plate 40 is preferably disposed against the capping portion 16, and beneath the housing 22. Although illustrated as a circular member in the present embodiment, other shapes can also be used. The stop plate 40 is inhibited from traveling in one direction by contact with the capping portion 16 and inhibited from traveling away from the capping portion 16 through the use of one or more locking members 60. The locking members 60 are preferably threaded members, such as shafts or bolts, disposed in threaded cavities of the stop plate 40 and capping portion 16, as shown. The locking members 60 can have a head for adjusting their position, as shown, such as a hexagonal head, a Phillips head, and so on.

Because the stop plate 40 is constrained between the capping portion 16 and the locking members 60, when the locking members 60 are unscrewed, or spaced away from the stop plate 40, the stop plate 40 is free to move away from the capping portion 16. Contact with the stop pin 30 can inhibit movement of the stop plate 40 under certain circumstances, such as when the valve shaft 10 is in a closed position, and the stop pin 30 is disposed as far toward the seat 27 as possible. In such a situation, the contact from the stop pin 30 will force the stop plate 40 against the capping portion 16. When the shaft 10 is moved away from the seat 27, however, some distance between the stop pin 30 and stop plate 40 may be present, and, if the locking members 60 are spaced away from the plate's surface, the stop plate 40 can move away from the capping potion 16. In some embodiments, the locking members 60 can be integrally formed with the stop plate 40. In other embodiments, they can be omitted.

The stop plate 40 can have an annular shape, as shown, and therefore can comprise a central cavity adapted to receive the adjustment element 50. Preferably, the cavity is cylindrical and threaded to accommodate the element 50. The adjustment element 50 can be a nut, a threaded shaft, or other suitable device. As shown, the adjustment element 50 preferably comprises one or more manipulation portions 52, such as the cavities in the illustrated embodiment. Such devices as spanners, a forked manipulation device, and the like can be inserted into the manipulation portions 52 to rotate the adjustment element 50. Preferably the adjustment element 50 has a central void to allow the valve shaft 10 to pass through it and a corresponding void in the stop plate 40. In certain embodiments, the adjustment element 50 can be moved through other manipulation than rotation, such as through inflation of a bladder element, extension of the adjustment element, and so on. Thus, although positioning of the stop plate 40 and adjustment element 50 are described here in the context of rotating a threaded adjustment element 50, other methods of manipulation are possible as well.

Because the adjustment element 50 is a threaded member seated in a threaded cavity and rotatable, its position relative to the stop plate 40 can be adjusted by rotating it. As one example, if standard pitch threading is used, if the adjustment element 50 is rotated counterclockwise, it will move away from capping portion 16 and protrude above the stop plate 40.

Preferably, the adjustment element 50 is disposed beneath the stop pin 30. Accordingly, under certain circumstances, the adjustment element 50 will contact the stop pin 30 when rotated.

When rotated clockwise, however, the adjustment element 50 will travel towards the capping portion 16. If it contacts the capping portion 16, further clockwise rotation of the adjustment element 50 will impart a force on the stop plate 40 directing it away from the capping portion 16. Thus, if the locking members 60 are positioned away from the stop plate 40 and the adjustment element 50 is rotated clockwise against the capping portion 16, the stop plate 40 will travel an adjustable distance away from the capping portion 16.

Through contact with the stop pin 30, the valve shaft 10 will also be moved an adjustable amount. Once a desired position of the stop plate 40 and/or valve shaft 10 has been reached, rotation of the adjustment element 50 can cease and the locking members 60 can be tightened against the stop plate 40 to inhibit further movement of the stop plate 40. Consequently, the stop plate 40 will be held in position by threaded engagement with the adjustment element 50 positioned against the capping portion 16 and by contact with the locking members 60. Accordingly, the trim level of the valve 2 can be adjusted by manipulation of members outside the control valve 2. As a result of manipulation external to the control valve, fluid integrity of the valve 2 can be maintained during adjustment, advantageously removing exposure of an operator to possibly hazardous fluid within. The housing 22 can be removed prior to trim adjustment and replaced following trim adjustment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A control valve having an external valve trim adjustor, the control valve comprising:
   a valve shaft comprising a contact member extending in a direction transverse to the valve shaft;
   a stationary valve cap adapted to receive the valve shaft;
   an adjustment member coupled to the valve cap; and
   a stop plate coupled to the contact member and threadedly coupled to the adjustment member, the stop plate positioned at least partially between the adjustment member and the contact member and adapted to position the contact member away from the valve cap in response to manipulation of the adjustment member.

2. The control valve of claim 1, wherein the adjustment member comprises a threaded surface.

3. The control valve of claim 2, wherein the adjustment member is a nut.

4. The control valve of claim 1, further comprising a plurality of locking members adapted to couple the stop plate to the valve cap.

5. The control valve of claim 1, wherein the contact member comprises a pin perpendicular to a longitudinal axis of the valve shaft.

6. The control valve of claim 1, wherein the stop plate comprises an annulus surrounding the adjustment member.

7. The control valve of claim 1, wherein the valve cap comprises a cavity adapted to receive the contact member.

8. A valve adjustment assembly for a valve, the valve adjustment assembly comprising:
   a valve shaft having a longitudinal axis and comprising a stop pin, the stop pin extending in a transverse direction to the longitudinal axis;
   an adjustment member surrounding the valve shaft, the adjustment member having a threaded surface and adapted to contact the stop pin; and
   a stop plate adapted to surround the adjustment member, contact the stop pin, and threadedly engage the threaded surface of the adjustment member, the stop plate adapted to change its position in response to rotation of the adjustment member, thereby changing the position of the stop pin.

9. The valve adjustment assembly of claim 8, wherein the adjustment member comprises a plurality of manipulation portions adapted to receive an instrument for rotating the adjustment member.

10. The valve adjustment assembly of claim 9, wherein the manipulation portions are adapted to receive a spanner.

11. The valve adjustment assembly of claim 8, wherein the stop plate comprises a port adapted to permit fluid to enter the valve.

12. The valve adjustment assembly of claim 11, further comprising a locking member disposed in the port, the locking member adapted to contact the stop plate, thereby inhibiting positioning of the stop plate past the locking member.

13. The valve adjustment assembly of claim 12, wherein the locking member comprises a threaded bolt.

14. A valve adjustment assembly for a poppet control valve comprising a valve shaft having a longitudinal axis, the valve adjustment assembly comprising:
   a plate having a central threaded portion and a plurality of ports;
   an adjustable threaded member disposed in the central threaded portion and threadedly engaged with the plate, the adjustable threaded member positionable by rotation;
   a plurality of locking members disposed in the plurality of ports, the plurality of locking members adapted to inhibit movement of the plate; and
   a contact member coupled to the valve shaft, disposed in a transverse direction to the longitudinal axis, and contacting the adjustable threaded member.

15. The valve adjustment assembly of claim 14, wherein the adjustable threaded member has a circular shape.

16. The valve adjustment assembly of claim 14, wherein the adjustable threaded member is adapted to adjust the position of the contact member when rotated.

17. The valve adjustment assembly of claim 14, wherein the plurality of locking members extend past the plate.

18. The valve adjustment assembly of claim 14, wherein the contact member extends at least partially through the valve shaft.

19. The valve adjustment assembly of claim 14, wherein the contact member is integrally formed with the valve shaft.

* * * * *